US006871293B2

United States Patent
Bomfim et al.

(10) Patent No.: US 6,871,293 B2
(45) Date of Patent: Mar. 22, 2005

(54) GAP DETECTOR DETECTING GAPS BETWEEN TRANSACTIONS TRANSMITTED BY CLIENTS AND TRANSACTIONS PROCESSED BY SERVERS

(75) Inventors: Joanes DePaula Bomfim, McLean, VA (US); Richard Stephen Rothstein, McLean, VA (US); James Edward Simmons, Falls Church, VA (US); Ashish Singh, Ashburn, VA (US)

(73) Assignee: American Management Systems, Inc., Fairfax, VA (US)

( * ) Notice: Subject to any disclaimer, the term of this patent is extended or adjusted under 35 U.S.C. 154(b) by 553 days.

(21) Appl. No.: 09/922,698

(22) Filed: Aug. 7, 2001

(65) Prior Publication Data

US 2003/0033554 A1 Feb. 13, 2003

(51) Int. Cl.[7] .............................................. G06F 11/00
(52) U.S. Cl. ........................................ 714/4; 714/821
(58) Field of Search .................... 714/4, 18, 20, 714/39, 43, 48, 818, 821, 15, 16, 17, 21, 27, 49; 709/102, 104, 206

(56) References Cited

U.S. PATENT DOCUMENTS

| 5,499,367 | A | * | 3/1996 | Bamford et al. ................ 707/8 |
| 5,606,601 | A | | 2/1997 | Witzman et al. ............ 379/113 |
| 5,835,497 | A | | 11/1998 | Litzenberger et al. ...... 370/522 |
| 5,991,771 | A | * | 11/1999 | Falls et al. ................... 707/202 |
| 6,449,734 | B1 | * | 9/2002 | Shrivastava et al. .......... 714/15 |
| 6,449,739 | B1 | * | 9/2002 | Landan ......................... 714/47 |
| 6,564,342 | B2 | * | 5/2003 | Landan ......................... 714/48 |
| 6,738,933 | B2 | * | 5/2004 | Fraenkel et al. .............. 714/47 |
| 2002/0184575 | A1 | * | 12/2002 | Landan ......................... 714/47 |
| 2003/0065986 | A1 | * | 4/2003 | Fraenkel et al. .............. 714/47 |

* cited by examiner

*Primary Examiner*—Nadeem Iqbal
(74) *Attorney, Agent, or Firm*—Staas & Halsey LLP (57) ABSTRACT

A client/server computer architecture having a gap detector detecting gaps in sequence numbers of transactions transmitted by clients and processed by servers. When a gap is detected to thereby indicate that a respective transaction was transmitted but not processed, the client that originally transmitted the transaction is notified so that the client can retransmit the transaction.

15 Claims, 6 Drawing Sheets

GAP DETECTOR DETECTING GAPS BETWEEN TRANSACTIONS TRANSMITTED BY CLIENTS AND TRANSACTIONS PROCESSED BY SERVERS

BACKGROUND OF THE INVENTION

1. Field of the Invention

The present invention is directed to a gap detector detecting gaps between transactions transmitted by clients and processed by servers in a client/server computer architecture.

2. Description of the Related Art

In client/server computer architectures, clients transmit transactions to servers through a computer network. The servers receive and then process the transactions.

Such architectures can guarantee the delivery of the transactions to the servers, and processing of the transactions by the servers. To provide such a guarantee, the following processes are typically performed: (a) when a server receives a transaction from a client, the server transmits an acknowledgement to the client to confirm receipt of the transaction, (b) the receiving server updates a database at various synch points reached during processing of the transaction by the server, and (c) a final processing acknowledgement is transmitted from the server back to the client. These processes become significantly more complex in client/server computer architectures in which transactions are transmitted from server to server.

Unfortunately, the performance of all these processes will incur a heavy performance penalty. The performance penalty is especially severe in systems handling an extremely high volumes of transactions, unless a very heavy investment in hardware is made in ensure that bandwidth, memory, input/output (I/O) and computing power are available to handle the peak volumes.

For businesses that are unable or unwilling to make these heavy investments, the alternative has frequently been the use of batch techniques in which transactions are grouped into batches for transmission and processing. With batch techniques, it is assured that a group of transactions are processed accurately and none are lost or duplicated. However, batch techniques can result in undesirably long delays between the time a transaction is generated and the time the transaction is processed. In addition, there is an additional overhead for controlling the batches.

SUMMARY OF THE INVENTION

It is an aspect of the present invention to provide a client/server architecture which guarantees the delivery of transactions from clients to servers, and the processing of the transactions by the servers, without incurring a high performance penalty.

It is also an aspect of the present invention to be able to implement such an architecture via relatively simple add-on modifications to existing architectures.

Additional aspects of the present invention will be set forth in the description which follows, and, in part, will be obvious from the description, or may be learned by practice of the invention.

The above aspects can be attained by providing a gap detector receiving server information indicating which transactions transmitted by a client to a server through a computer communication network were processed by the server, and detecting gaps between the transmitted transactions and the processed transactions from the received server information, the gaps thereby indicating which of the transmitted transactions were not processed by the server.

The above aspects can also be attained by providing an apparatus including (a) a client adding sequence numbers to transactions, and then transmitting the transactions with the added sequence numbers; (b) a transaction log in which the client logs the transmitted transactions; (c) a server receiving the transmitted transactions with the added sequence numbers, removing the sequence numbers, and then processing the transactions with the removed sequence numbers; (d) a first file in which the server stores sequence numbers of transactions processed by the server; (e) a gap detector accessing the first file to receive the sequence numbers of the processed transactions, and, from the received sequence numbers, detecting whether there is a gap between the sequence numbers of the transmitted transactions and the sequence numbers of processed transactions, a gap indicating that at least one transmitted transaction was not processed; and (f) a second file in which the gap detector stores the sequence number for each of said at least one transmitted transaction, wherein the client accesses the second file to thereby be notified of the sequence number of each of said at least one transmitted transaction, and then accesses the transaction log to obtain and then retransmit each of said at least one transmitted transaction.

Aspects can also be attained by providing a gap detector receiving server information indicating which transactions transmitted by clients to servers through a computer communication network were processed by the servers, and detecting gaps between the transmitted transactions and processed transactions from the received server information, the gaps thereby indicating which of the transmitted transactions were not processed by the servers.

Moreover, aspects can be attained by providing an apparatus including (a) clients adding sequence numbers to transactions, and then transmitting the transactions with the added sequence numbers; (b) transaction logs in which the clients log the transmitted transactions; (c) servers receiving the transmitted transactions with the added sequence numbers, removing the sequence numbers, and then processing the transactions with the removed sequence numbers; (d) server files in which the servers store sequence numbers of transactions processed by the servers; (e) a gap detector accessing the server files to receive the sequence numbers of the processed transactions, and, from the received sequence numbers, detecting whether there is a gap between the sequence numbers of the transmitted transactions and the sequence numbers of processed transactions, a gap indicating that at least one transmitted transaction was not processed; and (f) a gap detector file in which the gap detector stores the sequence number for each of said at least one transmitted transaction, the clients accessing the gap detector file to thereby be notified of the sequence number of each of said at least one transmitted transaction. When a respective client is notified of a sequence number of a transaction transmitted by the client, the client accesses one of the transaction logs to obtain and then retransmit the transaction.

Further, aspects can be attained by providing an apparatus including (a) clients each having a corresponding client ID, each client adding its client ID and a sequence number to transactions transmitted by the respective client; (b) transaction logs in which the clients log the transmitted transactions; (c) servers receiving the transmitted transactions with the added client IDs and sequence numbers, removing the client IDs and sequence numbers, and then processing the transactions with the removed client IDs and sequence numbers; (d) server files in which the servers store information indicating the client ID and sequence number of each transaction processed by the servers; (e) a detector accessing the server files to receive the stored information, and, from the received information, detecting transmitted transactions which were not processed; and (f) a detector file in which the detector stores information indicating the client ID and sequence number for each of the detected transactions, the clients accessing the detector file to thereby be notified of the client IDs and sequence numbers of the detected transactions. When a respective client is notified of a sequence number of a transaction transmitted by the client, the client accesses one of the transaction logs to obtain and then retransmit the transaction.

Moreover, aspects can be attained by providing a detector automatically receiving sequence numbers of transactions transmitted by a client to a server through a computer communication network and processed by the server, and, from the received sequence numbers, automatically detecting transmitted transactions were not processed by the server, the client being notified of the detected transactions and then retransmitting the detected transactions.

Aspects can also be attained by providing a computer-implemented method including (a) automatically receiving sequence numbers of transactions transmitted by a client to a server through a computer communication network and processed by the server; (b) automatically, from the received sequence numbers, detecting transmitted transactions were not processed by the server; (c) automatically notifying the client of the detected transactions; and (d) after being notified of the detected transactions, automatically retransmitting the detected transactions by the client.

BRIEF DESCRIPTION OF THE DRAWINGS

These and other aspects and advantages of the invention will become apparent and more readily appreciated from the following description of the preferred embodiments, taken in conjunction with the accompanying drawing of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to like elements throughout.

Figure 1:
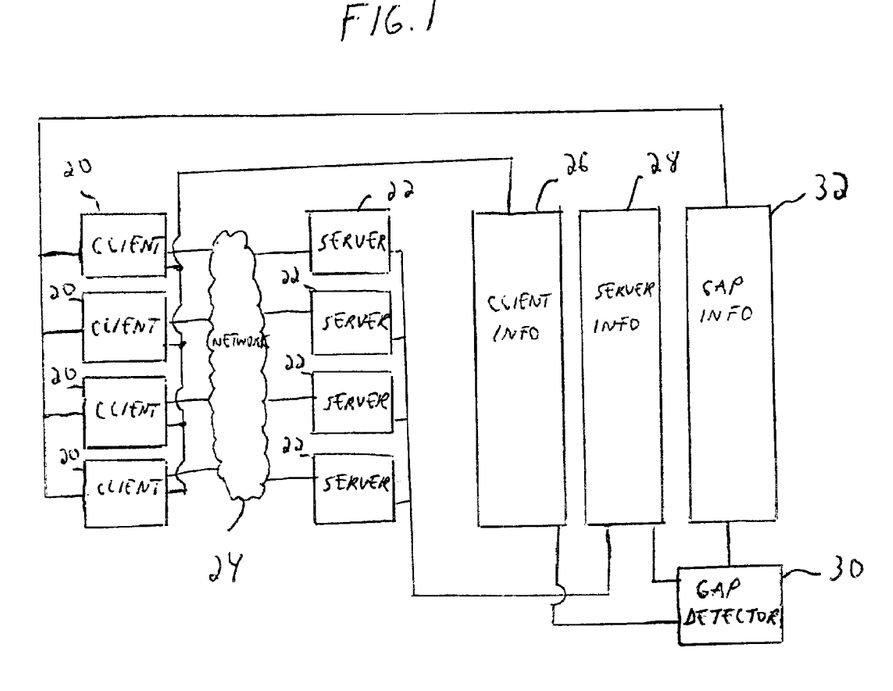
FIG. 1 is a diagram illustrating a client/server architecture, according to an embodiment of the present invention.

FIG. 1 is a diagram illustrating a client/server architecture, according to an embodiment of the present invention. Referring now to FIG. 1, clients 20 transmit transactions to application servers 22 through a computer communication network 24. Servers 22 then process the transactions. Although FIG. 1 shows only one layer of servers, there might be a series of connected servers before an end server, with transactions transmitted from server to server until processing by an end server. The significance of servers 22 in FIG. 1 is that they are end servers that actually processes transactions. However, the present invention is not limited to servers 22 being such end servers, or to a system having any particular server architecture.

As an example of the operation of an embodiment of the present invention, each client 20 has a corresponding client ID and adds the client ID and a sequence number to transactions transmitted by the respective client. As an example, if a respective client 20 transmits one-thousand (1000) transactions, the transactions might be transmitted in order with sequence numbers one (1) to one-thousand (1000), respectively, along with the client ID.

Each server 22 stores server information 28 indicating which of the transmitted transactions were processed by the respective server 22. The server information 28 includes, for example, the client ID and sequence number of each transaction processed by the respective server 22. A gap detector 30 receives server information 28, and sorts the sequence numbers in order by client ID. From this sorted server information 28, gap detector 30 detects gaps between the transmitted transactions and processed transactions. For example, the sorted server information 28 might indicate that transactions with sequence numbers one (1) through seventy-five (75) and seventy-seven (77) through one-hundred (100) from a respective client 20 with client ID 1 were processed by the various servers 22. From this sorted server information 28, gap detector 30 determines that the respective client 20 with client ID 1 transmitted a transaction with sequence number seventy-six (76) which was not processed. Therefore, gaps indicate which transmitted transactions were not processed by servers 22.

Gap detector 30 then stores gap information 32 identifying the transmitted transactions which were not processed. Each client 20 accesses gap information 32 to thereby be notified whether any transactions transmitted by the respective client were not processed, and then retransmits any such transactions.

In a typical embodiment, gap detector 30 would be able to detect gaps from only server information 28. However, in some embodiments, each client 20 might store client information 26. Client information 26 stored by a respective client 20 might include, for example, the highest sequence number transmitted by the respective client 20. This stored client information 26 could then be periodically updated. Gap detector 30 receives client information 26 and uses client information 26 to detect gaps. For example, gap detector 30 can compare the sequence numbers transmitted by clients 20 as indicated by client information 26 with the sequence numbers processed by servers 22 as indicated by server information 28, to thereby detect gaps. Client information 26 is not limited to including the highest sequence number transmitted. For example, client information 26 should simply be information which identifies which transactions were transmitted.

Each client 20 might, for example, store client information 26 on a periodic basis and/or gap detector 30 might access client information 26 on a periodic basis. For example, on a periodic basis (such as, for example, every five or fifteen minutes), each client 20 might store the highest sequence number transmitted by the respective client 20 as client information 26. On a periodic basis (such as, for example, every five or fifteen minutes), gap detector 30 might access the stored client information 26.

By providing client information 26 which is eventually received by gap detector 30, each client 20 can be seen as reporting client information 26 to gap detector 30. Similarly, by providing server information 28 which is eventually received by gap detector 30, each server 22 can be seen as reporting server information 28 to gap detector 30.

Moreover, there are many different ways to report transmitted and processed transactions to gap detector 30. For example, as indicated above, each client 20 might simply report the highest sequence number of its transmitted transactions. Alternatively, in some embodiments, each client might report all the sequence numbers of its transmitted transactions, instead of simply the highest sequence number. Such reporting could be done in real-time, or on a periodic basis.

Similarly, there are various manners in which servers 22 can report the sequence numbers of processed transactions. For example, each server 22 might update server information 28 as each transaction is processed, to include the sequence number of the processed transactions. However, the present invention is not limited to any particular manner in which servers 22 report sequence numbers of processed transactions.

Therefore, it should be understood that the present invention is not limited to any particular way of reporting transmitted and processed transactions.

As indicated above, gap detector 30 analyzes server information 28, and, in some embodiments, also client information 26. From the analyzed information, gap detector 30 determines which transactions were transmitted but not processed. Clients 20 are notified of transactions which were transmitted but not processed, and then clients 20 retransmit such transactions.

Although FIG. 1 shows four (4) clients 20 connected to four (4) servers 22 through network 24, the present invention is not limited to any specific number of clients, any specific number of servers, any specific correlation in the number of clients to the number of servers, or any specific client/server architecture.

In some embodiments, each client 20 might include routing information to route transactions through network 24 to servers 22. However, the present invention is not limited to any particular manner of routing transactions, or to routing information being included in a transaction by a client.

Moreover, network 24 is not limited to being based on any specific type of technology. For example, network 24 might transmit transactions via electronic communications, optical communications, wired communications and/or wireless communications. Moreover, network 24 might be a public network, a private network or some combination of public/private networks. As an example, network 24 might be, or include, the Internet.

Figure 2:
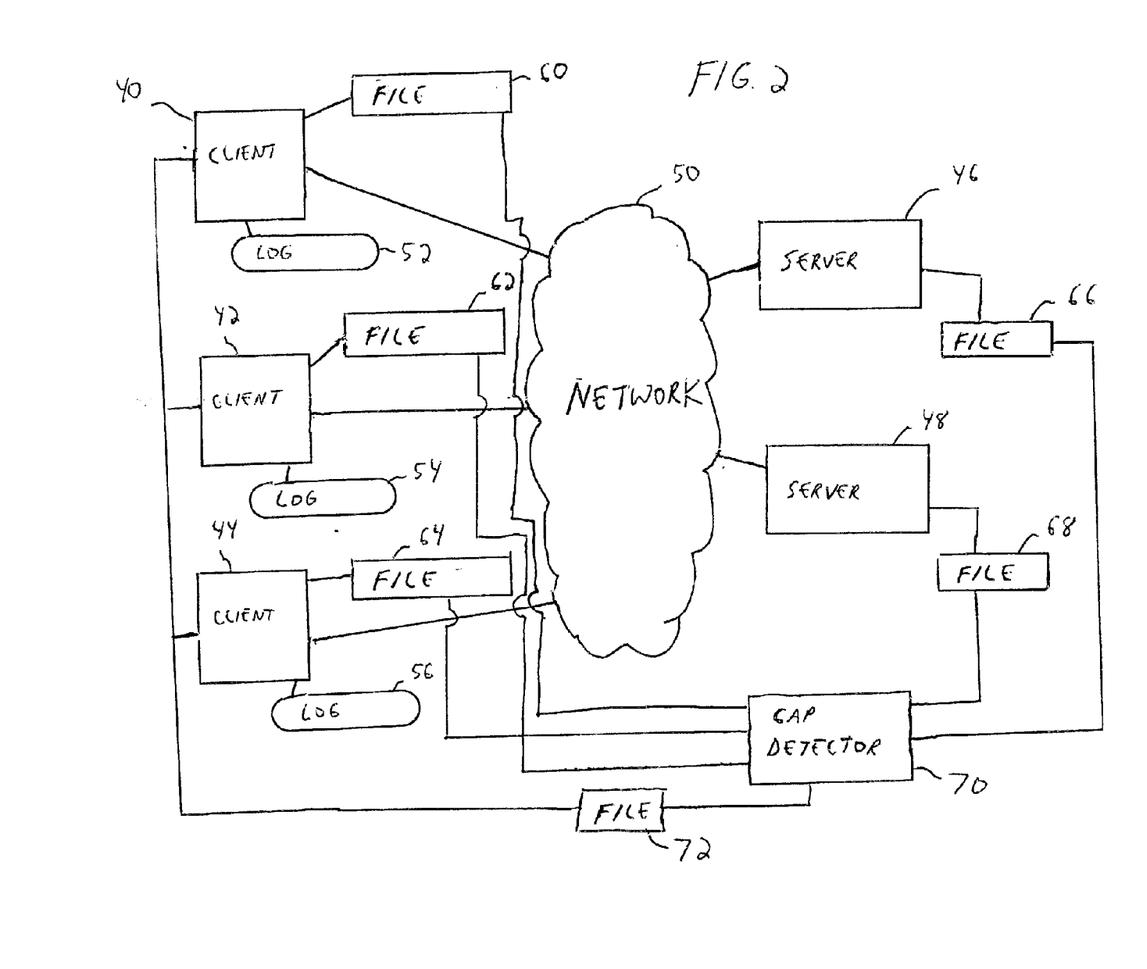
FIG. 2 is a more detailed diagram illustrating a client/server architecture, according to an embodiment of the present invention.

FIG. 2 is a more detailed diagram illustrating a client/server architecture, according to an embodiment of the present invention. Referring now to FIG. 2, clients 40, 42 and 44 transmit transactions to servers 46 and 48 through a computer communication network 50. Each transmitted transaction includes, for example, a client ID and sequence number for the transmitting client. Clients 40, 42 and 44 have access to transaction logs 52, 54 and 56, respectively, in which the clients log transmitted transactions. Moreover, in this embodiment, clients 40, 42 and 44 have access to files 60, 62 and 64, respectively. As an example, each client 40, 42 and 44 periodically stores the highest sequence number of its transmitted transactions in files 60, 62 and 64, respectively.

Similarly, servers 46 and 48 have access to files 66 and 68, respectively, in which the servers store information indicating the client IDs and sequence numbers of processed transactions.

A gap detector 70 accesses files 66 and 68 to obtain the client IDs and sequence numbers of the processed transactions. From this information, gap detector 70 detects whether there is a gap between the sequence numbers of the transmitted transactions and the sequence numbers of the processed transactions for each client. A gap indicates that at least one transmitted transaction was not processed.

When a gap is detected, gap detector 70 determines the sequence numbers of each transmitted transaction that was not processed, and stores information indicating these sequence numbers with their associated client IDs in a file 72. For example, gap detector 70 might store ranges of sequence numbers and their associated client IDs in file 72. Alternatively, gap detector 70 might store each individual sequence number with information indicating their associated client IDs. There are many different ways in which gap detector 70 can store information indicating the sequence numbers and their associated client IDs, and the present invention is not limited to any particular way.

Clients 40, 42 and 44 access file 72, and are thereby notified of the sequence numbers and client IDs of the transactions that were not processed. Each client 40, 42 and 44 then retransmits the unprocessed transactions which were originally transmitted by the respective client using information in the transaction logs 52, 54 and 56, respectively. In this manner, receipt and processing of transmitted transactions by server 46 or 48 is guaranteed.

As indicated above, in an embodiment of the present invention, gap detector 70 can detect gaps in the sequence numbers of each transmitted transaction that was not processed, simply from the information stored in files 66 and 68. For example, in the present embodiment of the present invention, since transactions are numbered in sequence by each client and transmitted with a client ID, gap detector 70 can determine gaps in transmitted and processed transactions simply from the sequence numbers and client IDs of processed transactions stored in files 66 and 68. Generally, gap detector 70 simply sorts these sequence numbers by client ID, and determines whether there are any gaps in the sequence numbers for each client ID.

However, in some embodiments, gap detector 70 might also access files 60, 62 and 64 to obtain the sequence numbers of the transmitted transactions from the clients, and then also use this additional information to detect gaps. Providing sequence numbers from clients to gap detector 70 (for example, through the use of files 60, 62 and 64) can provide important advantages. For example, when a network or server failure occurs and transmitted transactions are not being received and/or processed by the servers, gap detector 70 can still determine which transactions have been transmitted if sequence numbers are provided from clients to gap detector 70

As an example of the operation of an embodiment of the present invention, clients 40, 42 and 44 periodically (such as, for example, at five or fifteen minute synch points) store the highest sequence numbers of their transmitted transactions in files 60, 62 and 64, respectively. Servers 46 and 48 store server information in files 66 and 68, respectively, indicating client IDs and sequence numbers of processed transactions. In an example embodiment, servers 46 and 48 store the server information in files 66 and 68 in real-time as processing for each transaction is completed, as opposed to storing the information at periodic synch points. Moreover, periodically (such as, for example at timed five or fifteen minute synch points), gap detector 70 accesses files 66 and 68, and possibly also files 60, 62 and 64, and processes the information to determine gaps. The gap information (such as the sequence numbers and client IDs of transmitted transactions which were not processed) would then be stored in file 72. Periodically (such as, for example, at timed synch points), clients 40, 42 and 44 would access file 72 and process the information to determine which transactions need to be retransmitted. Of course, the present invention is not limited to specific periodic intervals for synch points. Moreover, the present invention is not limited to information being stored, or files being accessed, in any particular time sequence or manner.

The various files (such as files 60, 62, 64, 66 and 68) can become very long after a large number of transactions are transmitted and processed. Therefore, in embodiments of the present invention, files might be periodically closed and a new file opened to perform the intended operation. For example, at a synch point, a respective server might close out its associated file and create a new file to store new server information (such as client IDs and sequence numbers of processed transactions). A gap detector would then access the closed out file to detect gaps. As an example, the gap detector might "pull" (i.e., copy) the closed out file to a location local to the gap detector. In a similar manner, clients might close out files, and the gap detector might pull the closed out files of the clients. Similarly, the gap detector might close out files storing the gap information, and the clients would pull the closed out files. Such opening/closing of files, and pulling of files, would be understood by a person of skill in the art.

By using files and pulling the files, the system does not incur a performance premium which would be required, for example, if clients 40, 42 and 44 used electronic messaging to transmit the sequence number of transmitted transactions or other information to gap detector 70, and servers 46 and 48 used electronic messaging to transmit the sequence numbers of processed transactions or other information to gap detector 70. Therefore, the use of files and the "pull" approach of various embodiments of the present invention provides significant advantages. However, the present invention is not limited to such use of files and a pull approach. For example, in some embodiments, electronic messaging may be used, or some combination of electronic messaging and pulling of files.

FIG. 2 shows each client 40, 42 and 44 as having its own separate transaction log 52, 54 and 56, respectively. However, the present invention is not limited to such a one-to-one correspondence. Instead, for example, in some embodiments, various clients might share a transaction log, or a single transaction log might be provided for all of the clients.

Similarly, FIG. 2 shows each client 40, 42 and 44 as having its own separate file 60, 62 and 64, respectively, for storing sequence numbers of transmitted transactions. However, the present invention is not limited to such a one-to-one correspondence. Instead, for example, in some embodiments, various clients might share a file, or a single file might be provided for all the clients.

Moreover, FIG. 2 shows each server 46 and 48 as having its own separate file 66 and 68, respectively, for storing sequence numbers of processed transactions. However, the present invention is not limited to such a one-to-one correspondence. Instead, for example, in some embodiments, various servers might share a file, or a single file might be provided for all the servers.

In addition, FIG. 2 shows gap detector 70 as having a single file 72 in which gap detector 70 stores information. However, the present invention is not limited to such use of a single file. Instead, for example, a gap detector might store information in multiple files for notifying clients of transmitted transactions which were not processed.

Further, the present invention is not limited to transaction logs and/or files being stored in any particular location. For example, in FIG. 2, transaction logs 52, 54 and 56, and files 60, 62 and 64 should be stored in a location which is accessible by the clients. Typically, each transaction log and file would be stored in a local area of the associated client. For example, each transaction log and file might be stored on the same computer, or on the same local area network, as the associated client. However, the present invention is not limited to such examples. For example, the various transactions logs and files might be stored in a remote location and be accessible to the clients through network 50, or through a different network.

Similarly, files 66 and 68 would typically be stored on the same computer, or on the same local area network, as the associated server. However, the present invention is not limited to such examples. For example, the various server files might be stored in a remote location and be accessible to the servers through network 50, or through a different network.

Figure 3:
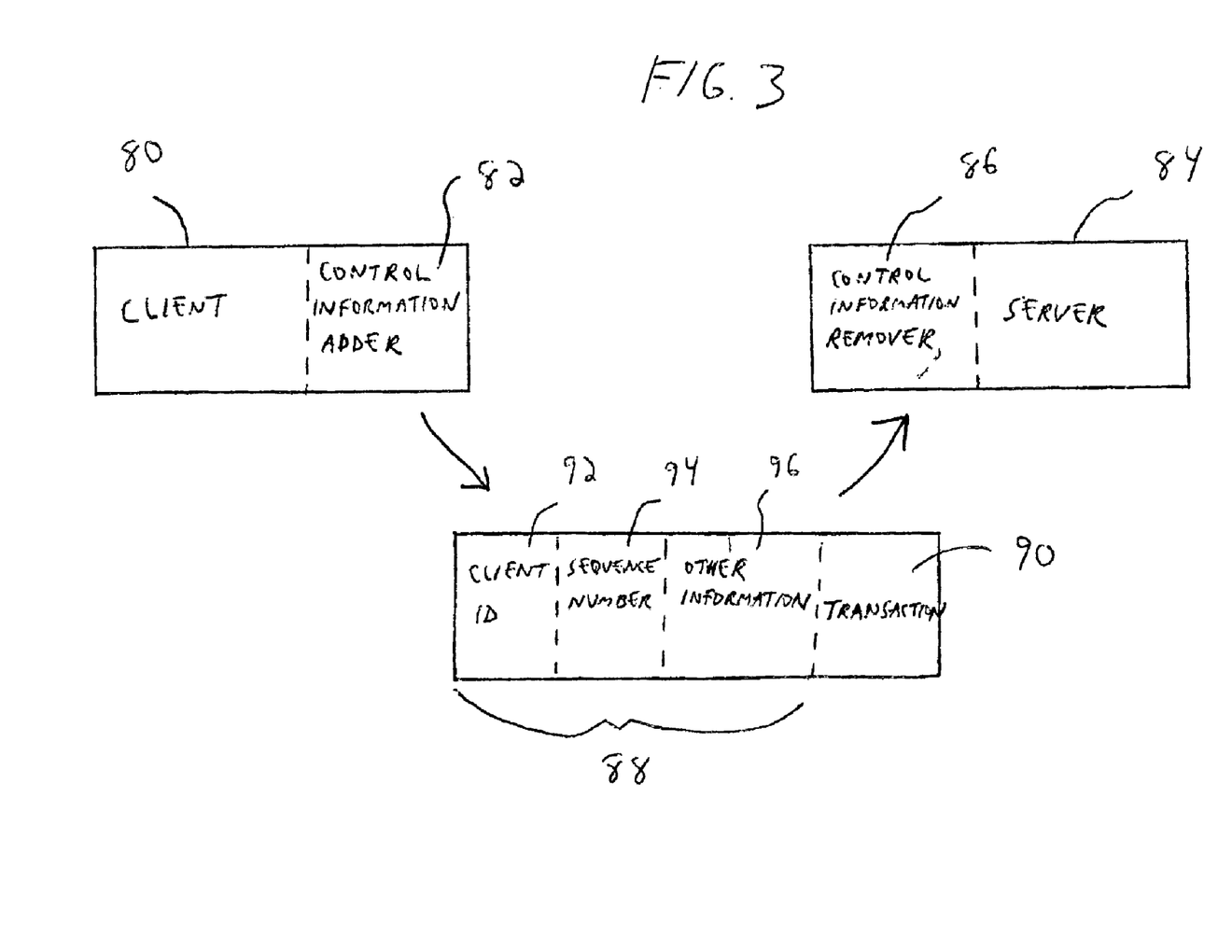
FIG. 3 is a diagram illustrating a client adding control information to a transaction and a server removing control information from the transaction, according to an embodiment of the present invention.

FIG. 3 is a diagram illustrating a client adding control information to a transaction and a server removing control information from the transaction, according to an embodiment of the present invention. Referring now to FIG. 3, a client 80 corresponds, for example, to any of clients 20 in FIG. 1 or clients 40, 42 and 44 in FIG. 2. Client 80 includes a control information adder 82 which adds control information to each transaction transmitted by the respective client 80. Server 84 corresponds, for example, to any of servers 22 in FIG. 1 or servers 46 and 48 in FIG. 2. Server 84 includes a control information remover 86 which removes the control information from transactions received by the respective server 84. Server 84 then processes the transaction without the control information.

As illustrated in FIG. 3, control information 88 added to a transaction 90 by client 80 and removed by server 84 might include, for example, a client ID 92 to identify the respective client that transmitted the transaction, a sequence number 94 of the transaction and other information 96 which may be useful. However, the present invention is not limited to control information 88 including client ID 92, sequence number 94 and other information 96. For example, control information 88 might simply include client ID 92 and sequence number 94. In some embodiments, control information 88 might simply include sequence number 94. Therefore, the present invention is not limited to any particular information being included in control information 88.

There are many existing client/server systems already in use. Therefore, control information adder 82 can be designed as a relatively simple software add-on, or possibly a software/hardware add-on, that an easily be added to an existing client. Similarly, control information remover 86 can be designed as a simple software add-on, or possibly a software/hardware add-on, that an easily be added to an existing server. In this manner, various embodiments of the present invention can easily be added to existing architectures.

Figure 4:
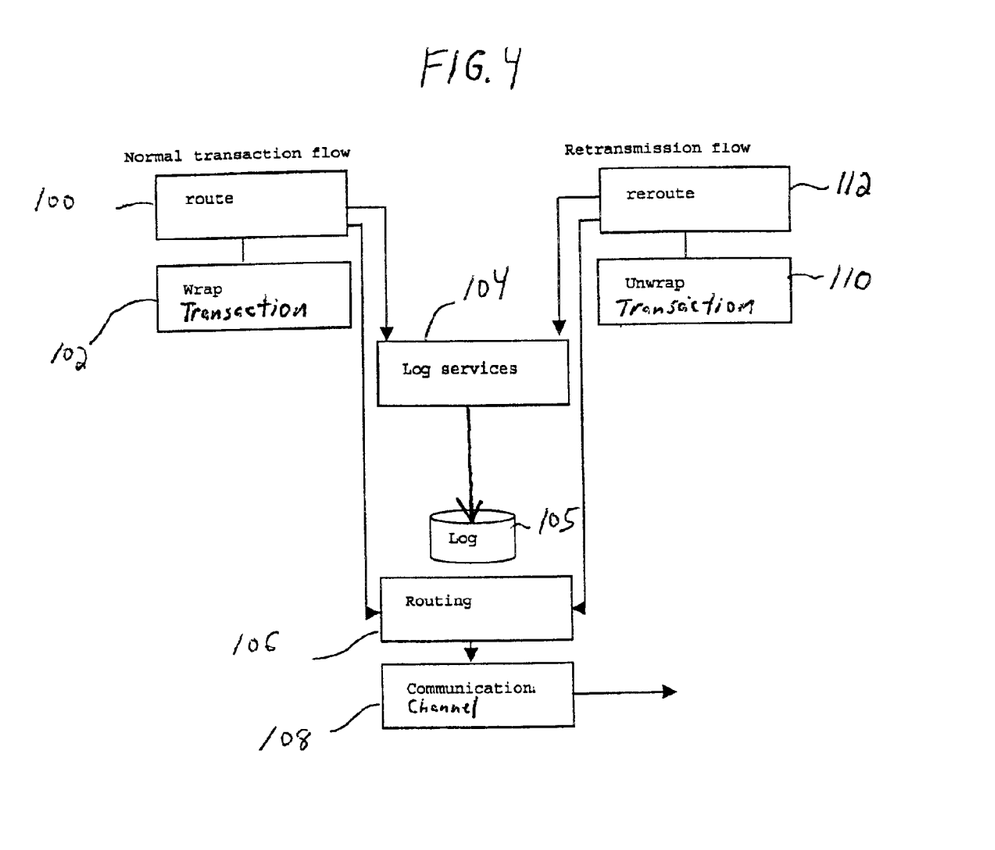
FIG. 4 is a diagram illustrating the operation of a client to transmit and retransmit transactions, according to an embodiment of the present invention.

FIG. 4 is a diagram illustrating the operation of a client to transmit and retransmit transactions, according to an embodiment of the present invention. Referring now to FIG. 4, for normal transaction flow to transmit a transaction to a respective server, a client uses a route process 100 to indicate that the transaction is to be routed, typically in accordance with a routing algorithm. The client then uses a wrap transaction process 102 to wrap, or include, control information with the transaction. The client then uses a log services process 104 to write the transaction with the control information to an appropriate transaction log 105 (see, for example, transaction logs 52, 54 and 56 in FIG. 2). A routing process 106 then physically routes the transaction with the control information through a communication channel 108 (such as network 50 in FIG. 2) to the server specified by the routing process.

For retransmission flow to retransmit a transaction, a client uses the log services process 104 to retrieve the respective transaction from log 105. The client then uses an unwrap transaction process 110 to unwrap the control information from the retrieved transaction. In this embodiment, the control information is unwrapped from the retrieved transaction to allow the client to examine the message to determine if there is any information that would be necessary for the routing algorithm to select a different server to which the transaction will be rerouted. However, the present invention is not limited to unwrapping the retrieved message, and other approaches are possible.

In FIG. 4, after the retrieved message is unwrapped, the client uses a reroute process 112 to wrap control information back into the transaction and to reroute the transaction to the same, or possibly a different, server.

The processes shown in FIG. 4 would typically be performed by software within the client, and/or by add-on software such as control information adder 82 in FIG. 3. Moreover, it should be understood that FIG. 4 is only one example of processes that can be performed by a client in accordance with embodiments of the present invention. However, the present invention is not limited to these specific processes, and many different processes and flows are, of course, possible.

Figure 5:
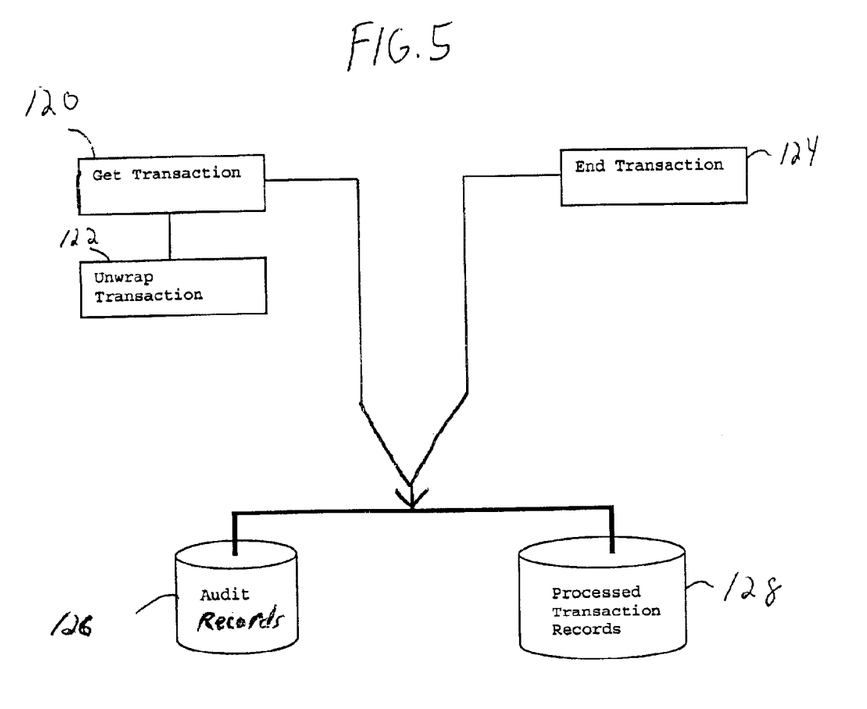
FIG. 5 is a diagram illustrating the operation of a server to process transactions, according to an embodiment of the present invention.

FIG. 5 is a diagram illustrating the operation of a server to process transactions, according to an embodiment of the present invention. Referring now to FIG. 5, a server uses a get transaction process 120 to obtain the next transaction to be processed. The server then uses an unwrap transaction process 122 to remove the control information from the transaction. The server then processes the transaction without the control information. The server uses an end transaction process 124 to create, for example, audit records 126 and processed transaction records 128. Generally, audit records 126 are complete records of the transactions that were processed by the server. Processed transaction records 128 include the server information provided to a gap detector for detecting gaps. For example, processed transaction records would include, for example, a list or sequence numbers of transactions which were processed by the respective server.

Although FIG. 5 shows the creation of audit records 126, the present invention is not limited to the creation of such records.

The processes shown in FIG. 5 would typically be performed by software within the server, and/or by add-on software such as control information remover 86 in FIG. 3. Moreover, it should be understood that FIG. 5 is only one example of processes that can be performed by a server in accordance with embodiments of the present invention. However, the present invention is not limited to these specific processes, and many different processes and flows are, of course, possible.

The present invention describes transactions as being "processed" by servers. Here, the term "processed" indicates that the transactions are operated on, or "processed", by a software application run by a server. For example, the present invention might be applied to a client/server architecture in which the clients send information for telephone call transactions to servers which run software applications for processing the transactions. Such software applications might include applications for formatting, editing and rating each transaction so that customers of telephone companies can be appropriately billed for the transactions. As many existing applications are not designed to process control information, various embodiments of the present invention remove the control information from the transaction before the transaction is processed by the server. In this manner, the application run by the server will not be confused by the control information.

Figure 6:
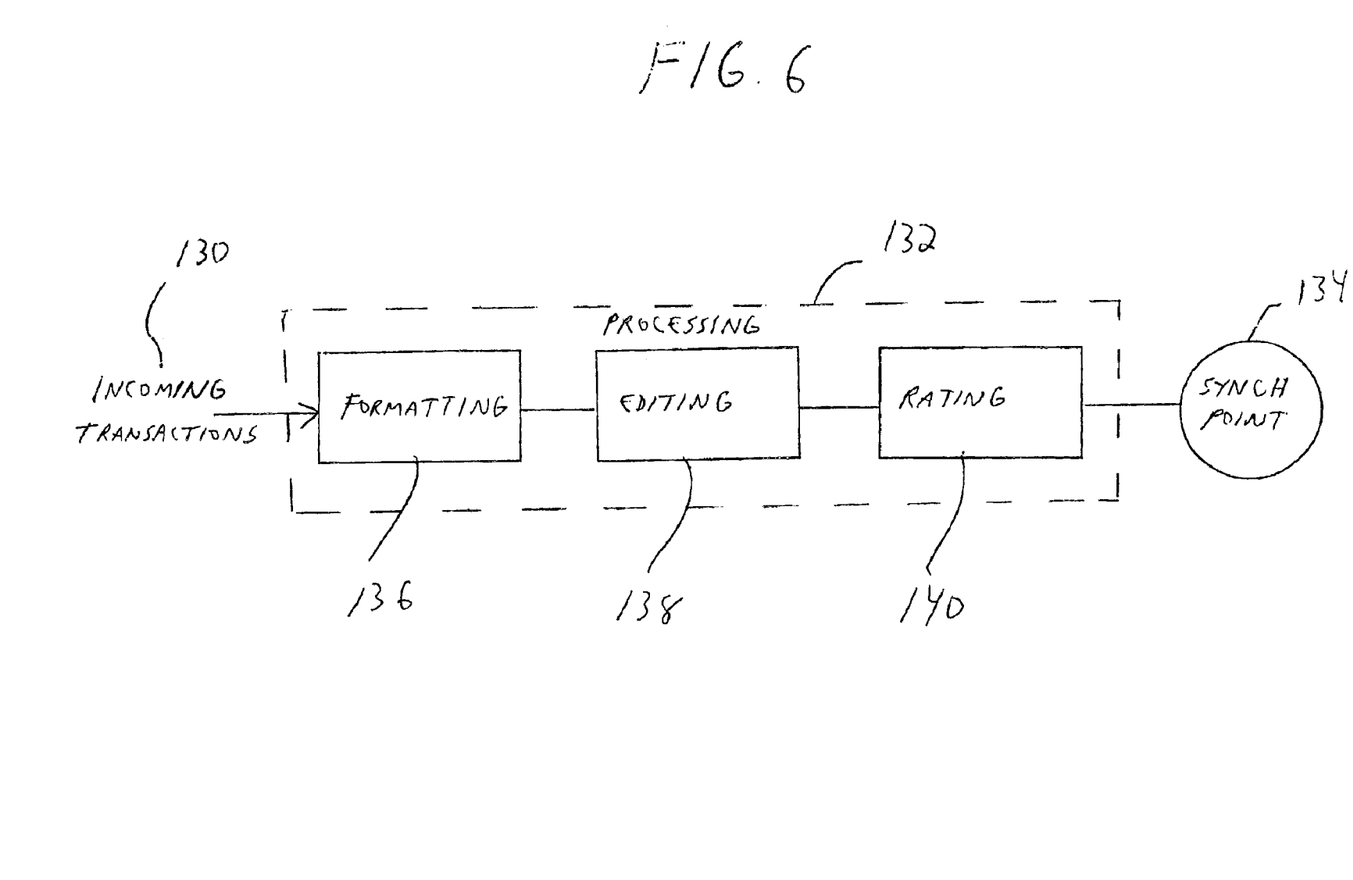
FIG. 6 is a diagram illustrating processing performed by a server, according to an embodiment of the present invention.

For example, FIG. 6 is a diagram illustrating processing performed by a server, according to an embodiment of the present invention. Referring now to FIG. 6, incoming transactions 130 are transactions which have been received by the server and have had their control information removed by the server. Transactions 130 then undergo processing 132 by the server. That is, transactions 103 are processed by applications run by the server. After processing 132 is complete, the server creates server information identifying the transactions which were processed by the server. For example, as described above, the server information includes the sequence numbers of the processed transactions. In a typical embodiment, the server information would be created at a synch point 134 occurring after the completion of processing 132 by the server.

In the specific example in FIG. 6, processing 132 includes, for example, formatting 136, editing 138 and rating 140 for processing call transactions. Of course, the present invention is not limited to a server performing these specific operations as part of processing, or to transactions being call transactions.

The following is a specific example of the operation of the present invention, according to an embodiment of the present invention. Referring again to FIG. 2, assume that client 40 transmits three (b 3) transactions. The first transaction is given sequence number 1, and is transmitted to server 46. The second transaction is given sequence number 2, and is also transmitted to server 46. The third transaction is given sequence number 3, and is transmitted to server 48. Client 40 records each transaction along with its sequence number in transaction log 52. Moreover, client 40 periodically stores information indicating the highest sequence number of its transmitted transactions in file 60.

In a similar manner, client 42 transmits two transactions. The first transaction is given sequence number 1, and is transmitted to server 48. The second transaction is given sequence number 2, and is also transmitted to server 48. Client 42 records each transaction, along with its sequence number and destination server, in transaction log 54. Client 42 periodically stores information indicating the highest sequence number of its transmitted transactions in file 62.

Moreover, client 44 transmits one transaction which is given sequence number 1 and is transmitted to server 46.

Client 44 records the transaction, along with its sequence number and destination server, in log 56. Client 44 periodically stores information indicating the highest sequence number of its transmitted transactions in file 64.

Server 46 receives and process the transaction given sequence number 1 from client 40 and the transaction given sequence number 1 from client 44. But, for some reason, server 46 does not receive and/or process the transaction given sequence number 2 transmitted from server 40. Therefore, server 46 records in file 66 that the transaction given sequence number 1 from client 40 and the transaction given sequence number 1 from client 44 were processed.

Server 48 receives and processes the transaction given sequence number 3 from client 40, the transaction given sequence number 1 from client 42, and the transaction given sequence number 2 from client 42. Therefore, server 48 records in file 68 that the transaction given sequence number 3 from client 40, the transaction given sequence number 1 from client 42, and the transaction given sequence number 2 from client 42 were processed.

Periodically, gap detector 70 accesses files 60, 62 and 64 to determine the sequence numbers of transactions transmitted by clients 40, 42 and 44, and accesses files 66 and 68 to determine the transactions processed by servers 46 and 48. As an example, gap detector 70 merges and sorts the information from files 66 and 68, to arrange the processed transactions in sequence by client. This information is typically all that is necessary for gap detector 70 to determine that the transaction given sequence number 2 transmitted from client 40 was not processed. However, gap detector 70 might also compare this merged and sorted information from files 66 and 68 with that from files 60, 62 and 64, to determine that the transaction given sequence number 2 transmitted from client 40 was not processed.

Gap detector 70 then stores information in file 72 indicating that the transaction given sequence number 2 transmitted from client 40 was not processed. Clients 40, 42 and 44 periodically access file 72. From such access, client 40 determines that its transaction given sequence number 2 was not processed, and then retransmits this transaction.

Of course, this is only one example of the operation of the present invention, and the present invention is not limited to this specific example.

In various embodiments of the present invention, gap detector 70 might provide a time stamp to detected gap information such as that stored, for example, file 72. A time stamp can be used to periodically notify appropriate clients that a retransmission is required.

Therefore, generally, as indicated above, clients perform certain processes. For example, in an embodiment of the present invention, clients attach a client ID and sequence number to transactions, and log the transactions in a transaction log. Moreover, clients periodically access a gap detector file to determine whether any retransmissions are necessary. If retransmissions are necessary for a respective client, the client retrieves the transaction from its transaction log, and then retransmits the transaction. In some embodiments, each client also periodically stores information indicating the sequence numbers of its transmitted transactions in a file. In some embodiments, each client would also appropriately open and close such files at appropriate times. For example, one file might be opened and another file closed at specific synch points, or when a file becomes too long.

Generally, as indicated above, servers perform certain processes. For example, in an embodiment of the present invention, as it completes processing of each transaction, each server adds the sequence number and client ID of the transaction to a file which stores the client IDs and sequence numbers of transactions processed by the server. Typically, this storing operation of a server into a file would be performed at a synch point at the end of processing of each transaction. In some embodiments, it may be necessary to modify an application running on the server so that a synch point is incurred after each transaction. In some embodiments, each server would also appropriately open and close files at appropriate times. For example, one file might be opened and another file closed at specific synch points, or when a file becomes too long.

Generally, as indicated above, a gap detector performs certain processes. For example, in an embodiment of the present invention, a gap detector periodically pulls the sequence numbers stored by the servers, and sorts the sequence numbers by clients to determine which transmitted transactions were not processed. The gap detector then stores this information in a file which is accessed by the clients, to thereby provide notification to the clients of transmitted transactions which were not processed. To make the determination, the gap detector might also pull the information stored by the clients indicating the sequence numbers of the transmitted transactions. In some embodiments, the gap detector might check to determine how long a gap has been opened, and then take some action to further notify the appropriate client that the gap has not been closed. For example, in this situation, the gap detector might record an unprocessed transaction in a file coded for a respective client, or send a transmission to the client, to ask for retransmission.

To avoid duplicate retransmissions, various precautions can be retaken. For example, as indicated above, a gap detector might check to determine how long a gap has been open without an appropriate retransmission, and then take some action to further notify the appropriate client that the gap has not been closed. Such a time check by the gap detector should be sufficiently long to ensure that the gap detector does not ask for another retransmission before a prior retransmission of the transaction is processed. Further, before notifying a client that a retransmission is necessary, a gap detector might first check to determine if all servers are operating normally.

According to various of the above embodiments of the present invention, a gap detector automatically receives sequence numbers of transactions which were transmitted by a client and processed by the server, and automatically detects gaps between the transmitted and processed transactions from the received sequence numbers, to thereby detect transmitted transactions that were not processed by the server. The client is then automatically notified of the detected transactions and then automatically retransmits the detected transactions. To detect the gaps, the gap detector might also automatically receive sequence numbers of transmitted transactions from the client. Here, the term "automatically" indicates that required operations are performed in an automated manner by a computer, without human intervention.

As indicated above, a gap detector receives server information (such as sequence numbers and client IDs of processed transactions) and, in some embodiments, also receives client information (such as sequence numbers of transmitted transactions). Here, the term "receives" simply indicates that the information is somehow obtained by the gap detector. For example, the information can be obtained by the gap detector by accessing files (such as, for example, files 60, 62, 64, 66 and/or 68 in FIG. 2) or by receiving a message or signal which indicates or somehow provides the information to the gap detector. Moreover, information can be received by the gap detector via proactive efforts on the part of the gap detector to obtain the required information, or by passive efforts by the gap detector to simply receive the required information. Thus, the present invention is not limited to any particular manner in which the gap detector receives information.

Similarly, as indicated above, clients are notified of transmitted transactions which were not processed. Here, the term "notified" simply indicates that the clients are made aware of the transmitted transactions which were not processed. Such notification can occur, for example, by the clients accessing a file (such as, for example, file 72 in FIG. 2), or by receiving a message or signal indicating or somehow providing the required information to the clients. Moreover, such notification can occur via proactive efforts on the part of the client to get the required information, or by passive efforts by the clients to simply receive the required information. Thus, the present invention is not limited to any particular manner in which the clients are notified.

As indicated above, a gap detector receives server information and, in some embodiments, also receives client information. Server information might be, for example, as sequence numbers and client IDs of processed transactions. Client information might be, for example, sequence numbers of transmitted transactions. However, the present invention is not limited to server information as including sequence numbers and client IDs, or to client information including sequence numbers. Instead, server information and client information should simply be suitable information for allowing a gap detector to detect gaps.

In various of the above embodiments of the present invention, a gap detector detects gaps between transactions transmitted by clients and transactions processed by servers. The clients are then notified of a gap, and retransmit the unprocessed transactions. However, the present invention is not limited to detecting gaps between transactions transmitted by clients and transactions "processed" by servers. For example, the gap detector could simply detect gaps between transactions transmitted by clients and transactions "received" (as opposed to "processed") by servers. The clients would then be notified of a gap, and then retransmit the non-received transactions.

As indicated above, clients add sequence numbers to transactions. For example, each client has its own client ID, and might assign sequence numbers starting at one (1) and increasing to a maximum of four billion (4,000,000,000) determined by system design parameters. The client ID and a respective sequence number is then added to each transaction. After the four billionth transaction is transmitted by a respective client, it would probably be undesirable to restart the sequence numbers at one (1) for the same client ID, as such an approach would result in duplicate sequence numbers being assigned for the same client ID. Therefore, when the maximum sequence number is reached by a client, a new client ID might be assigned to the respective client, and the sequence numbers for that client with a new client ID might start again at one (1). However, there are many different ways to assign client IDs and sequence numbers, and the present invention is not limited to any particular way, or any particular client IDs or sequence numbers.

In accordance with the above embodiments of the present invention, by detecting gaps between transmitted and processed transaction via the use of pulling files, a client/server architecture can guarantee delivery and processing of transactions, reduce overhead, reduce costs and process an extremely high volume of transactions.

Further, with the above embodiments of the present invention, nearly transparent add-ons can be retrofitted to existing clients/servers, or the invention can easily be implemented with new clients/servers. In a typical embodiment, highly scalable low-cost PC-based components can be used for organizations that do not want to use expensive mainframe solutions. Further, embodiments of the present invention can provide real-time monitoring of the flow of transactions from clients to servers and their processing status, with immediate detection of gaps in this flow, followed by quick and automatic corrective action.

Moreover, embodiments of the present invention allow simpler communications protocols and synch points at specified intervals, rather than after each transaction.

In various embodiments of the present invention, a transaction is left intact from the transmission by a client to receipt by a server for processing. More specifically, in various embodiments, the transaction is not broken up into packets in the transmission between clients and servers and is instead transmitted as a whole. However, the present invention is not limited to such an embodiment.

Moreover, the present invention is particularly applicable for systems in which the transactions are independent events where the order in which transactions are processed does not matter. Because of such independent nature of the transactions, the processing of transactions can be distributed among many servers and there is a relatively low amount of overhead for the distributed processing. However, the present invention is not limited to such an embodiment.

The present invention relates to "transactions" transmitted by clients and processed by servers. Here, the term "transaction" is simply intended to refer to any type of message or communication which is transmitted by a client to a server for processing by an application run by the server.

The present invention can be applied in client/server architectures where a transaction is transmitted from one server to another server. For example, a transaction might be transmitted from a first server to a second server for processing by the second server, and then from the second server to a third server for processing by the third server. In this situation, a gap detector can be used to detect gaps (a) between transactions transmitted from the first server to the second server, and transactions of these which were processed by the second server, and (b) between transactions transmitted from the second server to the third server, and transactions of these which were processed by the third server. Therefore, generally, in this case, a respective server becomes a client when transmitting a transaction to another server.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. An apparatus comprising:
   a gap detector receiving server information indicating which transactions transmitted by a client to a server through a computer communication network were processed by the server, and detecting gaps between the transmitted transactions and the processed transactions from the received server information, the gaps thereby indicating which of the transmitted transactions were not processed by the server;

a control information adder adding control information to each transaction transmitted by the client, the control information including a sequence number of the transmitted transaction; and a control information remover removing control information from transmitted transactions received by the server to allow the server to process the transaction without the control information, the removed control information being used to determine the server information.

2. An apparatus as in claim 1, wherein, when a gap is detected by the gap detector to thereby indicate that a transmitted transaction was not processed by the server, the client is notified that the transmitted transaction was not processed and then the client retransmits the transaction.

3. An apparatus as in claim 1, wherein the gap detector receives client information from the client indicating which transactions were transmitted by the client, and detects gaps between the transmitted transactions and the processed transactions in accordance with the received client information and the received server information, the apparatus further comprising:

a first file in which the client stores the client information, the gap detector accessing the first file to thereby receive the client information; and a second file in which server stores the server information, the gap detector accessing the second file to thereby receive the server information.

4. An apparatus as in claim 3, further comprising:

a third file in which the gap detector stores information indicating that a gap has been detected, the client accessing the third file to thereby be notified that a gap has been.

5. An apparatus as in claim 2, further comprising:

a first file in which server stores the server information, the gap detector accessing the first file to thereby receive the server information; and a second file in which the gap detector stores information indicating that a gap has been detected and indicating which of the transmitted transactions were not processed, the client accessing the second file to thereby be notified which transmitted transactions were not processed.

6. An apparatus as in claim 2, further comprising:

a log in which the client logs transmitted transactions, the client accessing the log to retrieve and retransmit a respective transaction when the client is notified that the transmitted transaction was not processed.

7. An apparatus comprising:

a client adding sequence numbers to transactions, and then transmitting the transactions with the added sequence numbers;

a transaction log in which the client logs the transmitted transactions;

a server receiving the transmitted transactions with the added sequence numbers, removing the sequence numbers, and then processing the transactions with the removed sequence numbers;

a first file in which the server stores sequence numbers of transactions processed by the server;

a gap detector accessing the first file to receive the sequence numbers of the processed transactions, and, from the received sequence numbers, detecting whether there is a gap between the sequence numbers of the transmitted transactions and the sequence numbers of processed transactions, a gap indicating that at least one transmitted transaction was not processed; and a second file in which the gap detector stores information indicating the sequence number for each of said at least one transmitted transaction, wherein the client accesses the second file to thereby be notified of the sequence number of each of said at least one transmitted transaction, and then accesses the transaction log to obtain and then retransmit each of said at least one transmitted transaction.

8. An apparatus comprising:

a gap detector receiving server information indicating which transactions transmitted by clients to servers through a computer communication network were processed by the servers, and detecting gaps between the transmitted transactions and processed transactions from the received server information, the gaps thereby indicating which of the transmitted transactions were not processed by the servers, wherein each client includes a control information adder adding control information to each transaction transmitted by the respective client, the control information including a sequence number of the transmitted transaction, and each server includes a control information remover removing control information from transmitted transactions received by the respective server to allow the server to process the transaction without the control information, the removed control information being used to determine the server information.

9. An apparatus as in claim 8, wherein, when a gap is detected by the gap detector to thereby indicate that a respective transmitted transaction was not processed by a server, the client that originally transmitted the transaction is notified that the transmitted transaction was not processed and then the client retransmits the transaction.

10. An apparatus as in claim 8, further comprising: server files in which the servers store the server information, the gap detector accessing the server files to thereby receive the server information.

11. An apparatus as in claim 10, further comprising:

a gap detector file in which the gap detector stores information indicating that a gap has been detected, the clients accessing the gap detector file to thereby be notified that a gap has been detected.

12. An apparatus as in claim 9, wherein the gap detector receives client information from the clients indicating which transactions were transmitted by the clients, and detects gaps between the transmitted transactions and the processed transactions from the received client information and the received server information, the apparatus further comprising:

client files in which the clients store the client information, the gap detector accessing the client files to thereby receive the client information;

server files in which servers store the server information, the gap detector accessing the server files to thereby receive the server information; and a gap detector file in which the gap detector stores information indicating that a gap has been detected and indicating which of the transmitted transactions were not processed, the clients accessing the gap detector file to thereby be notified which transmitted transactions were not processed.

13. An apparatus as in claim 9, wherein each client includes a log in which the respective client logs transactions transmitted by the client, the client accessing the log to retrieve and retransmit a respective transaction when the client is notified tat the transmitted transaction was not processed.

14. An apparatus comprising:

clients adding sequence numbers to transactions, and then transmitting the transactions with the added sequence numbers;

transaction logs in which the clients log the transmitted transactions;

servers receiving the transmitted transactions with the added sequence numbers, removing the sequence numbers, and then processing the transactions with the removed sequence numbers;

server files in which the servers store sequence numbers of transactions processed by the servers;

a gap detector accessing the server files to receive the sequence numbers of the processed transactions, and, from the received sequence numbers, detecting whether there is a gap between the sequence numbers of the transmitted transactions and the sequence numbers of processed transactions, a gap indicating that at least one transmitted transaction was not processed; and a gap detector file in which the gap detector stores information indicating the sequence number for each of said at least one transmitted transaction, the clients accessing the gap detector file to thereby be notified of the sequence number of each of said at least one transmitted transaction, wherein, when a respective client is notified of a sequence number of a transaction transmitted by the client, the client accesses one of the transaction logs to obtain and then retransmit the transaction.

15. An apparatus comprising;

clients each having a corresponding client ID, each client adding its client ID and a sequence number to transactions transmitted by the respective client;

transaction logs in which the clients log the transmitted transactions;

servers receiving the transmitted transactions with the added client IDs and sequence numbers, removing the client IDs and sequence numbers, and then processing the transactions with the removed client IDs and sequence numbers;

server files in which the servers store information indicating the client ID and sequence number of each transaction processed by the servers;

a detector accessing the server files to receive the stored information, and, from the received information, detecting transmitted transactions which were not processed; and a detector file in which the detector stores information indicating the client ID and sequence number for each of the detected transactions, the clients accessing the detector file to thereby be notified of the client IDs and sequence numbers of the detected transactions, wherein, when a respective client is notified of a sequence number of a transaction transmitted by the client, the client accesses one of the transaction logs to obtain and then retransmit the transaction.

* * * * *

UNITED STATES PATENT AND TRADEMARK OFFICE
CERTIFICATE OF CORRECTION

PATENT NO. : 6,871,293 B2
DATED : March 22, 2005
INVENTOR(S) : Joanes DePaula Bomfim et al.

It is certified that error appears in the above-identified patent and that said Letters Patent is hereby corrected as shown below:

Column 1,
Line 30, delete "an".
Line 32, change "in" to -- to --.

Column 8,
Line 64, change "an" to -- can --.

Column 9,
Line 1, change "an" to -- can --.

Column 10,
Line 49, change "(b 3)" to -- (3) --.

Column 11,
Line 5, change "process" to -- processes --.

Column 14,
Line 1, change "transaction" to -- transactions --.

Column 15,
Line 39, insert -- detected -- after "been".

Column 17,
Line 11, change "tat" to -- that --.

Signed and Sealed this

Twenty-fifth Day of October, 2005

JON W. DUDAS
*Director of the United States Patent and Trademark Office*